(12) United States Patent
Lan et al.

(10) Patent No.: US 7,746,729 B2
(45) Date of Patent: Jun. 29, 2010

(54) ELECTRONIC DEVICE WITH WORKING MODE SWITCHING FUNCTION AND METHOD OF SWITCHING WORKING MODE

(75) Inventors: Chung-Jen Lan, Taipei Hsien (TW);
Bo-Ching Lin, Taipei Hsien (TW);
Xiao-Guang Li, Shenzhen (CN);
Yun-Ru Chen, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/185,130

(22) Filed: Aug. 4, 2008

(65) Prior Publication Data

US 2009/0168608 A1 Jul. 2, 2009

(30) Foreign Application Priority Data

Dec. 29, 2007 (CN) .......................... 2007 1 0125669

(51) Int. Cl.
*G04B 47/06* (2006.01)
*G04C 21/00* (2006.01)
(52) U.S. Cl. ............................. 368/11; 368/74; 368/250
(58) Field of Classification Search .................... 368/10, 368/11, 73–74, 250–251, 261–263, 82, 223
See application file for complete search history.

(56) References Cited

U.S. PATENT DOCUMENTS

| 3,834,153 | A  | * | 9/1974  | Yoda et al.    | 368/251 |
|-----------|----|---|---------|----------------|---------|
| 4,316,273 | A  | * | 2/1982  | Jetter         | 368/47  |
| 4,426,157 | A  | * | 1/1984  | Jetter         | 368/73  |
| 4,430,006 | A  | * | 2/1984  | Jetter         | 368/73  |
| 5,095,468 | A  | * | 3/1992  | Sato           | 368/72  |
| 5,189,648 | A  | * | 2/1993  | Cooper et al.  | 368/73  |
| 5,926,442 | A  | * | 7/1999  | Sirhan et al.  | 368/73  |
| 6,314,384 | B1 | * | 11/2001 | Goetz          | 702/177 |
| 6,975,563 | B2 | * | 12/2005 | de Brito       | 368/109 |
| 2004/0156271 | A1 | * | 8/2004 | Brito        | 368/109 |
| 2007/0285396 | A1 | * | 12/2007 | Fu           | 345/169 |

* cited by examiner

*Primary Examiner*—Vit W Miska
(74) *Attorney, Agent, or Firm*—Zhigang Ma

(57) ABSTRACT

A method of switching working modes, the method includes: supplying a storage unit, therein the storage unit stores at least two working modes, alarm information, and alarm time, the alarm information includes indicating information and determining information; detecting whether a system time matches the alarm time; outputting the indicating information when the system time matches the alarm time; receiving input; determining whether the input matches the determining information; controlling the electronic device to switch from one working mode to another working mode when the input matches the determining information. An electronic device with working modes switching function is also provided.

10 Claims, 2 Drawing Sheets

ELECTRONIC DEVICE WITH WORKING MODE SWITCHING FUNCTION AND METHOD OF SWITCHING WORKING MODE

BACKGROUND

1. Technical Field

The present invention relates to an electronic device with working mode switching function that can switch working modes after confirmation.

2. General Background

Many electronic devices include a plurality of working modes, and can switch among different working modes, e.g. a normal working mode and an energy-saving mode. Under a normal working mode, an electronic device works under normal configurations; under an energy-saving mode, it can, for example, change a display background according to light. When there is little ambient light, the display need low brightness and contrast, and the electronic device can adjust accordingly to save energy.

But switching between different working modes is usually done automatically. Thus, if a user wants to use a different working mode, he or she must manually reset working mode settings, which is inconvenient.

Therefore, an electronic device that prompts for confirmation from a user before switching working modes is needed.

SUMMARY

A method of switching working modes, the method includes: supplying a storage unit, therein the storage unit stores at least two working modes, alarm information, and alarm time, the alarm information includes indicating information and determining information; detecting whether a system time matches the alarm time; outputting the indicating information when the system time matches the alarm time; receiving input; determining whether the input matches the determining information; controlling the electronic device to switch from one working mode to another working mode when the input matches the determining information.

Other advantages and novel features will be drawn from the following detailed description of exemplary embodiments of the present invention with reference to the accompanying drawing.

BRIEF DESCRIPTION OF THE DRAWINGS

The components of the drawings are not necessarily drawn to measuring scale, the emphasis instead being placed upon clearly illustrating the principles of the electronic device with working mode switching function that can switch working mode after confirmation. Moreover, in the drawings, like reference numerals designate corresponding parts throughout the several views.

DETAILED DESCRIPTION OF THE EMBODIMENTS

Figure 1:
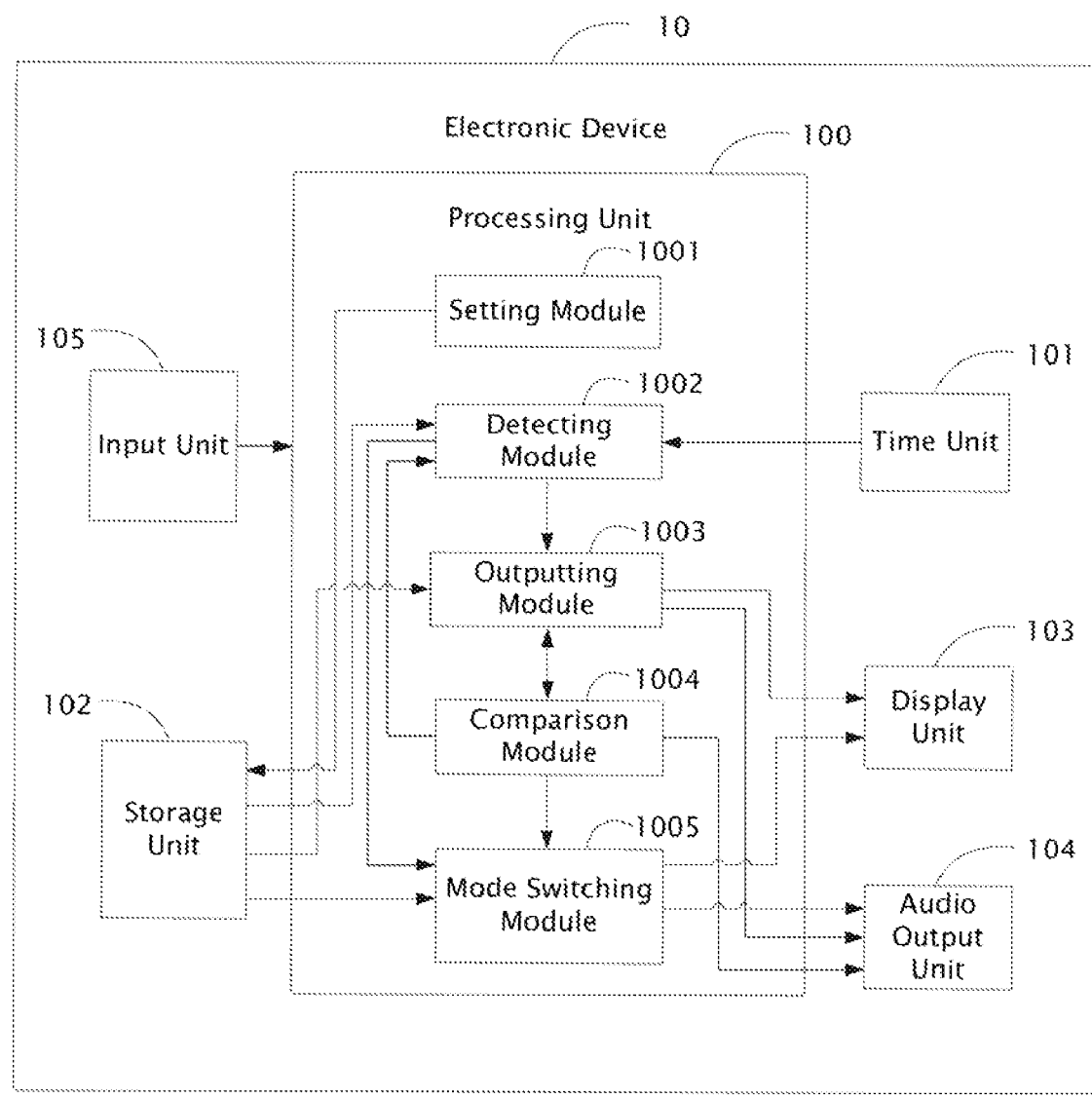
FIG. 1 is an exemplary block diagram of a hardware infrastructure of an electronic device with a working mode switching function in accordance with an exemplary embodiment of the invention.

FIG. 1 is an exemplary block diagram of a hardware infrastructure of an electronic device with a working mode switching function in accordance with an exemplary embodiment of the invention. The electronic device 10 includes a processing unit 100, a time unit 101, a storage unit 102, a display unit 103, an audio output unit 104, and an input unit 105.

The time unit 101 is used for supplying a system time. The display unit 103 and the audio output unit 104 are used for outputting video or audio information according to an instruction of the processing unit 100. The input unit 105 is used for receiving users' input, it can be, but not limited to, keyboards, buttons, and touch screens.

The electronic device 10 has a normal working mode and at least one special working mode, for example, a sleep mode. In the normal working mode, the electronic device 10 displays images normally and performs predefined functions according to the user's operations. In the special working mode, the electronic device 10 works differently from when it is in the normal working mode. For example, in the sleep mode, the electronic device 10 displays the system time and repeatedly changes a display background gradually from bright to dark.

The storage unit 102 stores alarm modes, alarm information, and alarm time. The alarm modes include, but are not limited to, a ring mode and a vibration mode.

The alarm information can be output via the audio output unit 104 or the display unit 103. The alarm information includes indicating information and determining information. The indicating information can be information configured for indicating that the alarm time is coming. For example, the indicating information can be a question such as "1+2=?", or playback of soft music etc. The determining information is information associated with the indicating information. Typically, the determining information is an input answering to the indicating information that a user should give if the user wants the working mode to be changed. For example, when the indicating information is "1+2=?", then the associated determining information is "3". When the indicating information is soft music, the associated determining information is an entry operation on the input unit 105, such as a keyboard input, a button input, a touch input, and so on.

When the system time matches the alarm time, the processing unit 110 outputs the indicating information via the display unit 103 or the audio output unit 104. The processing unit 100 waits for an input from the user, and if an input is received, determines whether the input matches the determining information, e.g. "3".

The alarm time is set by a user and indicates a time to switch working modes. When the system time matches the alarm time, the electronic device 10 outputs the indicating information. The alarm time includes a special mode alarm time and a normal mode alarm time. The special mode alarm time is the time when the electronic device 10 should be switched from the normal working mode to the special working mode, and the normal mode alarm time is the time when the electronic device 10 should be switched from the special working mode to the normal working mode.

The processing unit 100 includes a setting module 1001, a detecting module 1002, an outputting module 1003, a comparison module 1004, and a mode switching module 1005. The functions of the modules in the processing unit 100 are described below together with FIG. 2.

Figure 2:
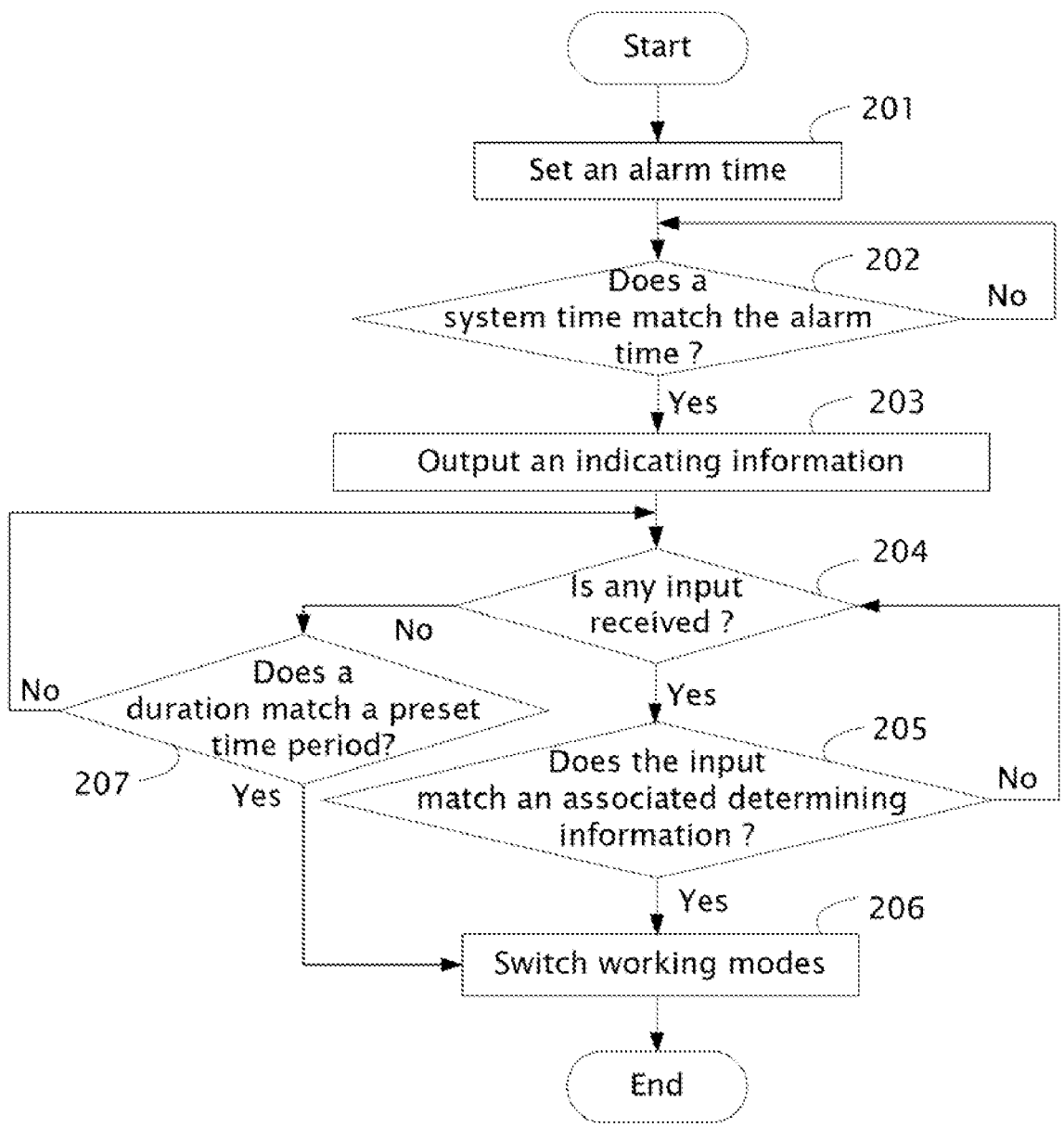
FIG. 2 is a method flowchart of automatically switching the working mode implemented by the electronic device of FIG. 1 in accordance with an exemplary embodiment of the invention.

FIG. 2 is a method flowchart of automatically switching the working modes implemented by the electronic device of FIG. 1 in accordance with an exemplary embodiment. In the present embodiment, the process of switching from the normal working mode to the special working mode is same as the process of switching from the special working mode to the normal working mode, therefore only the process of switching from the normal working mode to the special working mode is detailed.

In step 201, the setting module 1001 receives input by a user setting the alarm time and the alarm mode via the input unit 105, and stores these settings in the storage unit 102. However, the alarm time and the alarm mode can also be predefined in the storage unit 102.

In step 202, the detecting module 1002 periodically obtains the system time from the time unit 101 and the set alarm time from the storage unit 102, and determines whether the system time matches the alarm time. If the system time is prior to the alarm time, the detecting module 1002 repeats step 202.

If the system time matches the alarm time, in step 203, the outputting module 1003 obtains the alarm mode and the alarm information from the storage unit 102, outputs them via the display unit 103 or the audio output unit 104, and informs the time unit 101 to keep time from when the indicating information is output and measure a duration. The alarm information can be preset by the user, or can be randomly selected from alarm data predefined in the storage unit 102.

In step 204, the comparison module 1004 detects whether any input is received from the input unit 105.

In step 205, if input is received from the input unit 105, the comparison module 1004 determines whether the input matches the determining information of the output alarm information. If the input does not match the determining information of the output indicating information, the procedure goes to step 204, if the input does match, step 206 is next.

In step 206, the mode switching module 1005 controls the electronic device 10 to switch from the normal working mode to the special working mode.

In step 207, if no input is received from the input unit 105 in step 204, the comparison module 1004 determines whether the duration being kept by the time unit 101 matches a preset time period. If the duration is less than the preset time period, the procedure returns to step 204. If the duration is equal to or greater than the preset time period, the procedure goes to step 206.

In addition, in other embodiments, in step 205, the outputting module 1003 can output a comparison result of whether the input matches the determining information of the output indicating information via the display unit 103 or audio output unit 104, for example, "input right", "input wrong".

Although the present invention has been specifically described on the basis of a preferred embodiment thereof, the invention is not to be construed as being limited thereto. Various changes or modifications may be made to the embodiments without departing from the scope and spirit of the invention.

What is claimed is:

1. An electronic device with a working mode switching function comprising:
   a storage unit capable of storing at least two working modes, alarm information, and an alarm time, wherein the alarm information comprises indicating information and determining information, the two working modes comprise a normal working mode for the electronic device displaying normally and a sleep mode for the electronic device repeatedly changing a display background gradually from bright to dark;
   an input unit capable of receiving input;
   a detecting module capable of detecting whether a system time matches the alarm time;
   an outputting module capable of outputting the indicating information when the system time matches the alarm time;
   a comparison module capable of determining whether the input matches the determining information; and
   a mode switching module capable of controlling the electronic device to switch between the normal working mode and the sleep mode when the input matches the determining information.

2. The electronic device according to claim 1, further comprising a setting module capable of setting the alarm time.

3. The electronic device according to claim 2, wherein the indicating information of the alarm information indicates that the alarm time is coming and prompts for input.

4. The electronic device according to claim 3, wherein the storage unit is capable of storing the alarm time comprising a special mode alarm time and a normal mode alarm time, the special mode alarm time is the time to switch the normal working mode to the sleep mode, and normal mode alarm time is the time to switch the sleep mode to the normal working mode.

5. The electronic device according to claim 4, wherein the comparison module is further capable of determining whether a duration being kept by a time unit matches a preset time period, if the duration being kept by the time unit matches the preset time period, the mode switching module controls the electronic device to switch between the normal working mode and the sleep mode.

6. The electronic device according to claim 5, wherein the outputting module is further capable of outputting a comparison result of whether the input matches the determining information of the output indicating information.

7. A method of switching working modes, comprising:
   supplying a storage unit storing at least two working modes, alarm information, and alarm time, wherein the alarm information comprises indicating information and determining information, the two working modes comprise a normal working mode for the electronic device displaying normally and a sleep mode for the electronic device repeatedly changing a display background gradually from bright to dark;
   detecting whether a system time matches the alarm time;
   outputting the indicating information when the system time matches the alarm time;
   receiving input;
   determining whether the input matches the determining information;
   controlling the electronic device to switch between the normal working mode and the sleep mode when the input matches the determining information.

8. The method according to claim 7, further comprising, as the first step, setting an alarm time.

9. The method according to claim 8, further comprising determining whether a duration being kept by a time unit matches a preset time period after outputting the indicating information if no input is received, and if the duration matches the preset time period, controlling the electronic device to switch between the normal working mode and the sleep mode.

10. The method according to claim 9, further comprising outputting a comparison result of whether the input matches the determining information of the output indicating information after determining whether the input matches the determining information.

* * * * *